Sept. 1, 1931.  A. R. HAUFE  1,820,973
ELECTRIC AUTOMOBILE
Filed June 18, 1929  2 Sheets-Sheet 1
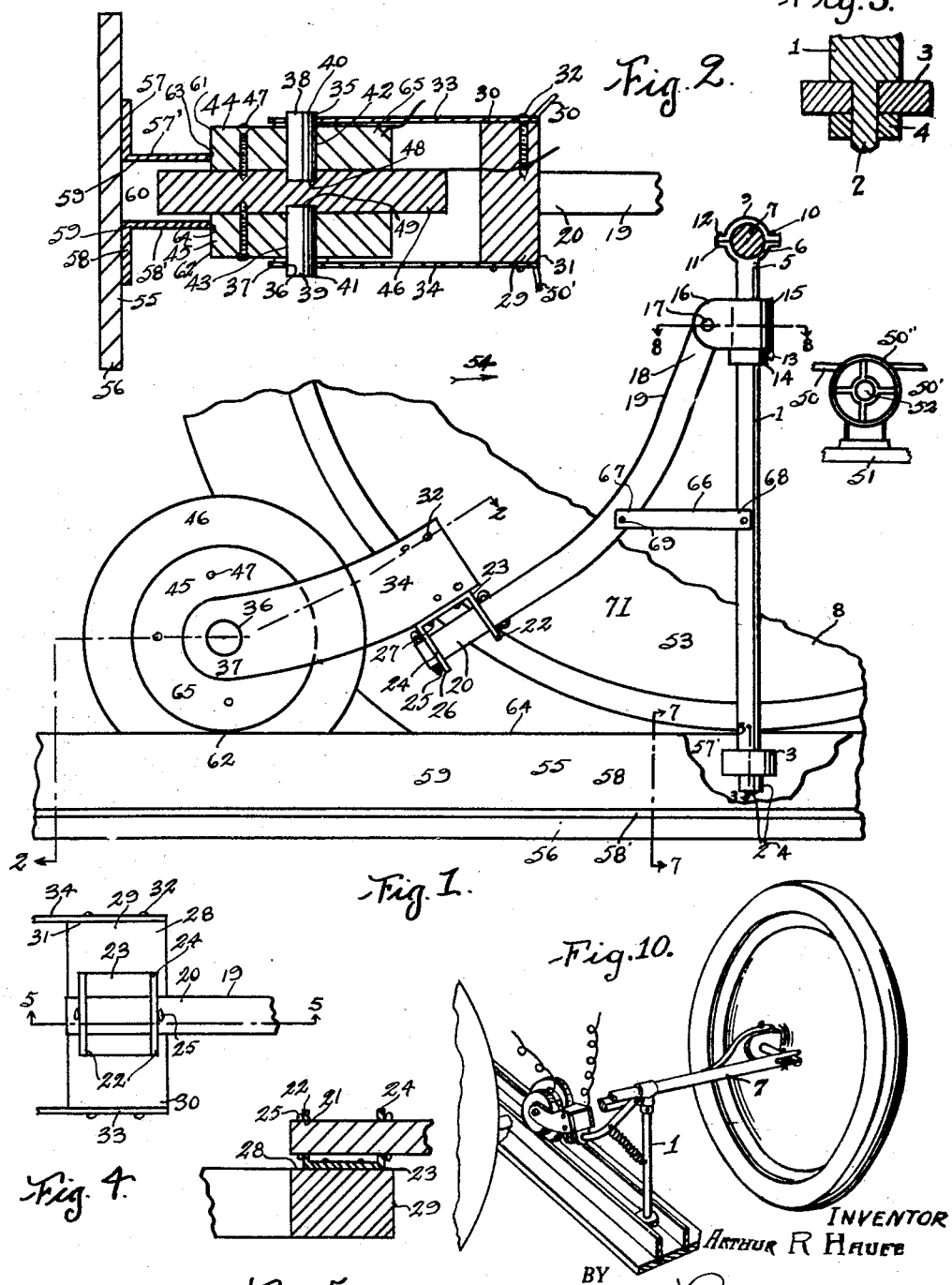

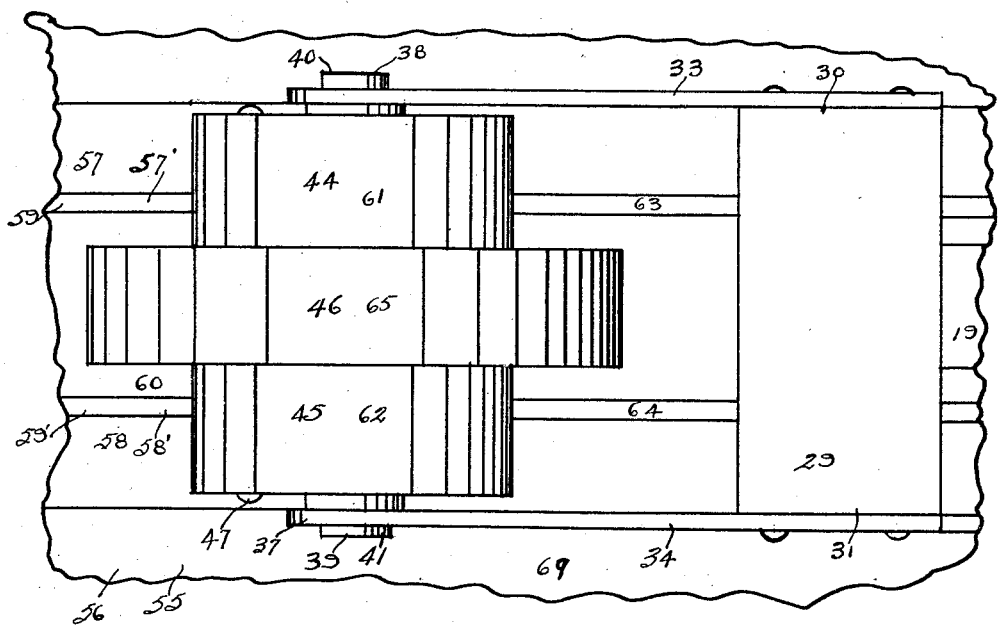
Fig. 6.
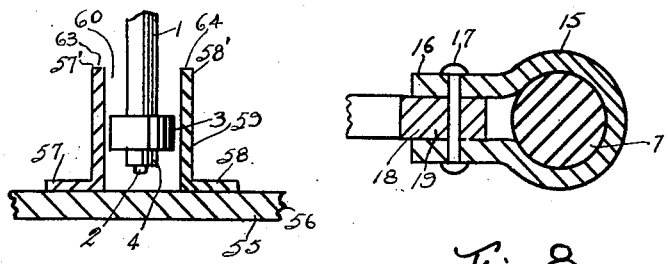
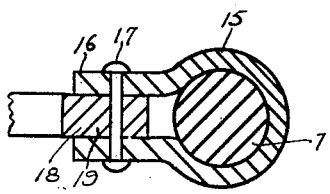
Fig. 7.    Fig. 8.
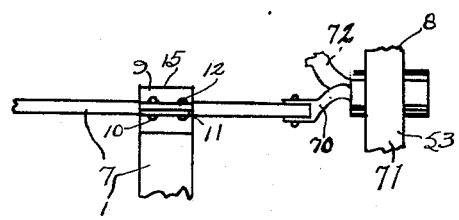
Fig. 9.
INVENTOR.
ARTHUR R HAUFE
BY
ATTORNEY.

Patented Sept. 1, 1931

1,820,973

UNITED STATES PATENT OFFICE

ARTHUR R. HAUFE, OF CINCINNATI, OHIO

ELECTRIC AUTOMOBILE

Application filed June 18, 1929. Serial No. 371,922.

The invention relates to electrically propelled vehicles particularly, although not exclusively, adapted for utilization as toys or playthings for children.

The objects of the invention are to provide a simple, efficient and practical electric toy automobile; to provide simple, economical and durable means, comprising in part a conductor wheel, whereby electrical current is conducted from a track to the operative means of said automobile; to provide efficient and dependable means, in part comprising a guide staff, whereby said automobile is steered; and to provide means whereby said conductor wheel is unadapted to become disconnected from its track.

The invention consists in the arrangement of the parts, combination of the elements, and in the details of the construction, as hereinafter claimed.

In the drawings:

Fig. 1 is a side elevation of the invention attached to an automobile with parts broken away;

Fig. 2 is a section taken on a line corresponding to 2—2 in Fig. 1;

Fig. 3 is a section taken on a line corresponding to 3—3 in Fig. 1;

Fig. 4 is a bottom view of the conductor wheel with the parts 33 and 34 broken away;

Fig. 5 is a section taken on a line corresponding to 5—5 in Fig. 4;

Fig. 6 is a plane view of the invention with parts broken away;

Fig. 7 is a section taken on a line corresponding to 7—7 in Fig. 1;

Fig. 8 is a section taken on a line corresponding to 8—8 in Fig. 1, with parts removed;

Fig. 9 is a front view of an automobile, showing the tie-rod, with parts broken away;

Fig. 10 is a perspective view from in front showing the connection of the steering means to the tie rod.

In the preferred construction of the invention I provide the vertical guide staff 1 having rotatably mounted on its reduced lower end 2 the fibre wheel 3 secured on the shaft by the nut 4 fixed to the shaft.

The upper end 5, of the staff 1, has the semi-circular groove 6 therein, in which is received the tie-rod 7 of the toy automobile, or other vehicle 8. The tie-rod 7 and the staff 1 are secured in fixed relation to each other, as by the semi-circular cap 9 which fits over the upper portion of the tie-rod and secured thereto as by the bolts 10 combinedly received through the lips 11 and 12, respectively, integral with the staff 1 and the cap 9.

Fixed to the upper end 5 of the staff 1, as by the set screw 13, is the collar 14, supporting the collar 15 having the rearwardly extending spaced apart ears 16. Intermediate the ears 16, and pivotally connected thereto by the pin 17 is the upper end front end 18 of the downwardly and rearwardly curved arm 19 having its lower and rearward end 20 received in the holes or perforations 21 in the downwardly extending spaced apart arms 22, integral with the base 23, of the support 24. The lower end 20 of the arm 19 is retained in the holes 21 as by the cotter pins 25 being received through the arm and positioned adjacent the outer sides 26 of the arms 22. The base 23 of the support 24 is secured, as by the bolts 27, to the lower surface 28 of the cross-member 29, formed from wood, formica, or other electric insulator. Secured to the ends 30 and 31, of the cross-member 29, as by the screws 32, are the side plates 33 and 34 having the holes 35 and 36 in their rear ends 37. The holes 35 and 36 rotatably receive the outer ends 38 and 39 of the shafts 40 and 41, received in the centrally disposed holes 42 and 43, respectively, in the outer electric current conducting discs 44 and 45. The disc 46, formed from wood, formica, or other electric non-conducting material, is received intermediate the discs 44 and 45, and secured thereto by the screws 47. The discs 44 and 45 are in alignment with each other and have considerably less diameter than the disc 46. The inner ends of the shafts 40 and 41 are received in the centrally disposed recesses 48 and 49 in the disc 46.

Fixed to the plates 33 and 34, respectively, are the electric current conductors 50 and 50′ which are connected to a suitable motor 50″ fixed to the support 51 of the automobile 8.

The power shaft 52 of the motor 50″ is operatively connected with one or more wheels 53 of the automobile, whereby electric current passing through the plate 33, conductor 50, motor 50″, conductor 50′ and the plate 34 is adapted to effect operation of the motor which transmits power to the wheels 53, thereby propelling the automobile in the forward direction indicated by the arrow 54.

The track 55 comprises the base 56, formed from wood, or other suitable material, having fixed to its upper surface the legs 57 and 58 of the L-shaped rails 59 and 59′. The legs 57 and 58 have integral therewith the legs 57′ and 58′ extending upwardly and in spaced apart relation with each other, whereby the space 60 is provided intermediate the legs 57′ and 58′.

Suitable outside source of electric supply is connected with the rails 59 and 59′. The voltage of the electric current is suitable to operate the usual electric motor 50″ of the automobile 8 and imparts sufficient power to the wheels 53 to effect movement of the vehicle.

The practical utilization and the mechanical operations of the invention, are as follows:

The staff 1, fixed to the tie-rod 7 of the automobile, has its lower end 2 received in the space 60, between the rails 59, whereby the fibre wheel 3, secured to the staff 1, is adapted to prevent friction of the staff with the inner surfaces of the legs 57′ and 58′, although the wheel 3 may be eliminated.

The disc 46 is permitted to extend downwardly in the space 60 between the rails 59, whereby the outer edges 61 and 62, respectively, of the discs 33 and 34, are in contact with the upper edges 63 and 64 of the legs 57′ and 58′, thereby permitting the conductor wheel 65 to roll upon the track 55, irrespective whether the automobile moves forwardly or rearwardly.

The resilient strip 66, having its ends 67 and 68 fixed by the screws 69 to the intermediate portion of the arm 19 and the staff 1, urges the conductor wheel 65 in continuous contact with the track. The resilient strip 66 may be substituted for any resilient member such as a coil spring, or the like.

When the rails 59 and 59′ are connected with suitable outside source of electric supply, the electric current passes through the disc 44, the shaft 40, the plate 33, the conductors 50 and 50′, the plate 34, the shaft 41 and the disc 45, thereby, through the means previously explained, imparting movement to the vehicle 8, having its wheels 53 in frictional contact with the floor 69 to which the base 56, under the track 55, may be suitably fixed.

The guide staff 1 is adapted to guide the vehicle 8, since movement of the guide staff imparts movement to the tie-rod 7, through the arm 19, the collar 15 and the staff 1. The usual tie-rod is connected to the usual steering knuckles 70, whereby movement of the tie-rod moves the front wheels 71 of the automobile, the tie-rod being forward of the axle 72.

It is apparent that I have invented a highly desirable device which may be successfully utilized as a toy electrically operated.

An advantage of the invention is that a motor vehicle, by means of the guide staff 1, is adapted to be steered at all times in approximately the same position with respect to the track 55, and the wheels 53 of the vehicle may roll upon the floor 69, or other support.

Another advantage of the invention is that continuous movement of the discs 44 and 45 in contact with the upper edges of the legs 57′ and 58′, of the rails 59 and 59′, assures dependable and continuous electrical contact, whereby the electric current in the rails is adapted to pass freely from the rails to the discs and motor 50″, and vice versa.

Another advantage of the invention is that it is practically impossible for the conductor wheel 65 to become disconnected with the track, because the disc 46 may extend a considerable distance downwardly into the space 60.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be restored to, when required, without sacrificing any of the advantages of the invention, as defined in the claims.

In other words, it is understood that changes and modifications in the embodiment of the invention, such as its size, the materials used and the like, as disclosed herein, can be made within the scope of what is claimed without departing from the spirit of the invention, as other expedients may readily suggest themselves to persons familiar in the art to which the invention appertains.

For instance, while I have designed the invention for the use as a mechanical toy for children, yet circumstances may result in profitable utilization of the invention in combination with vehicles adaptable to transport freight, passengers or both.

What I claim as new and desire to secure by Letters Patent is:

1. The combination with an electrically propelled vehicle having a tie-rod for steering said vehicle, of means for conducting electric current, a steering staff having connection with said tie-rod and adapted to engage said conducting means, and means for conducting electric current from said electriccurrent-conducting means to the electric means for propelling said vehicle.

2. The combination with an electrically propelled vehicle having a tie-rod for steering said vehicle, of means for conducting electric current, a steering staff having connection with said tie-rod and adapted to engage said conducting means, means for conducting electric current from said electric-current-conducting means to the electric means for propelling said vehicle, said second mentioned means comprising a conductor wheel having fixed thereto said second mentioned electric-current-conducting means adapted to contact said first mentioned conducting means.

3. In an electrically propelled vehicle having an electrically operated motor therein, the combination with a track comprising a base, and a pair of L-shape rails having their respective inner legs fixed in parallel relation to said base, and connected with electric current source of supply, the outer legs of said rails being at right angles to said base and in spaced apart and parallel relation with each other whereby a space is formed between said outer legs, of a vertical guide staff having its lower end extending downwardly in said space, a wheel rotatably mounted on said staff in said space and adapted to engage the inner sides of said outer legs, the upper end of said staff being fixed to the tie-rod of said vehicle, a downwardly curved arm having its upper end pivotally connected with the upper end of said staff, a conductor wheel comprising a pair of electric-current-conducting downwardly and rearwardly extending side plates having holes in their rear ends respectively, electric-current-conducting shafts, respectively, rotatably mounted in said holes, electric-current-conducting disc, respectively, having centrally disposed holes therein receiving said shafts, an electric-current-non-conducting disc intermediate said electric-current-conducting discs and fixed thereto, and having recesses centrally disposed in their sides, said recesses, respectively, receiving the inner ends of said shafts, said electric-current-non-conducting disc having greater diameter than said electric-current-conducting discs, an electric-current-non-conducting cross-member fixed intermediate the front ends of said side plates, a U-shape support fixed to said cross-member and comprising a base and spaced apart parallel legs extending downwardly from said cross-member and having perforations therein, the rear of said arm being received in said perforations, means to retain the rear end of said arm in said perforations, said conductor wheel adapted to ride upon said track and the lower portion of said electric-current-non-conducting disc extending in said space, but not engaging said base, and said electric-current-conducting discs adapted to rest upon the outer edges of said outer legs, respectively, and electric conductors connecting said side plates with the motor in said electric vehicle.

4. In an electrically propelled vehicle having an electrically operated motor therein, the combination with a track comprising a base, and a pair of L-shape rails having their respective inner legs fixed in parallel relation to said base, and connected with electric current source of supply, the outer legs of said rails being at right angles to said base and in spaced apart and parallel relation with each other, whereby a space is formed between said outer legs, of a vertical guide staff having its lower end extending downwardly in said space, a wheel rotatably mounted on said staff in said space and adapted to engage the inner sides of said outer legs, the upper end of said staff being fixed to the tie-rod of said vehicle, a downwardly curved arm having its upper end pivotally connected with the upper end of said staff, a conductor wheel comprising a pair of electric-current-conducting downwardly and rearwardly extending side plates, respectively, having holes in their rear ends, electric-current-conducting shafts, respectively, rotatably mounted in said holes, electric-current-conducting discs, respectively, having centrally disposed holes therein receiving said shafts, an electric-current-non-conducting disc intermediate said electric-current-conducting discs and fixed thereto, and having recesses centrally disposed in their sides, said recesses, respectively, receiving the inner ends of said shafts, said electric-current-non-conducting disc having greater diameter than said electric-current-conducting discs, an electric-current-non-conducting cross-member fixed intermediate the ends of said side plates, a U-shaped support fixed to said cross-member and having perforations therein, the rear of said arm being received in said perforations, said guide wheel adapted to ride upon said track and the lower portion of said electric-current-non-conducting disc extending in said space, but not engaging said base, and said electric-current-conducting disc adapted to rest upon the outer edges of said outer legs, respectively, and electric conductors connecting said side plates with the motor in said electric vehicle.

5. The combination with a track having a pair of rails connected with electric current source of supply, said rails having a space therebetween and of an electrically propelled automobile, of a staff having its lower end extending downwardly in said space, the upper end of said staff being fixed to the tie-rod of said vehicle whereby movement of said staff in said space is adapted to guide said automobile, an arm pivotally connected with said staff, a conductor wheel comprising a pair of electric-current-conducting side plates, respectively, having holes in their respective rear ends, electric-current-conducting shafts, respectively, rotatably mounted in said holes, electric-current-conducting discs, respectively, having centrally disposed holes therein receiving said shafts, an electric-current-non-conducting disc intermediate said electric-current-conducting discs and fixed thereto, said electric-current-non-conducting disc having greater diameter than said electric-current-conducting discs, an electric-current-non-conducting cross-member fixed intermediate said side plates, means fixing said arm to said cross-member, said conductor wheel adapted to ride upon said track with the lower portion of said electric-current-non-conducting disc extending into said space, and said electric-current-conducting discs adapted to ride upon said rails, respectively, and electric conductors to conduct electric current from said side plates to the electrically propelling means of said automobile.

6. The combination with a track having a pair of rails connected with electric current source of supply, said rails having a space therebetween and of an electrically propelled automobile, of a staff having its lower end extending downwardly in said space, the upper end of said staff being fixed to the tie-rod of said vehicle whereby movement of said staff in said space is adapted to guide said automobile, an arm pivotally connected with said staff, a conductor wheel comprising a pair of electric-current-conducting side plates, respectively, having holes in their rear ends, electric-current-conducting shafts, respectively, rotatably mounted in said holes, electric-current conducting discs, respectively, having centrally disposed holes therein receiving said shafts, an electric-current-non-conducting disc intermediate said electric-current-conducting discs and fixed thereto, said electric-current-non-conducting disc having greater diameter than said electric-current-conducting disc, an electric current-non-conducting cross-member fixed intermediate said side plates, means fixing said arm to said cross-member, said conductor wheel adapted to ride upon said track with the lower portion of said electric-current-non-conducting disc extending into said space, and said electric-current-conducting discs adapted to ride upon said rails, respectively, and electric conductors to conduct electric current from said side plates to the electrically propelling means of said automobile, and resilient means connecting said arm with said staff whereby said conductor wheel is urged in continuous contact with said track.

7. The combination with an electrically propelled vehicle having a steering knuckle and a tie-rod connected thereto, of a track comprising a pair of rails having connection with electric source of supply and having a space therebetween, a vertical staff having its lower end extending downwardly in said space and adapted to engage the inner sides of said rails, the upper end of said staff being fixed to said tie-rod, a downwardly extending arm having its upper end pivotally connected with the upper end of said staff, a conductor wheel having an electric-current-conducting disc, adapted to ride upon said track, and electric conductors connecting said disc with the electric means for propelling said vehicle.

8. The combination with an electrically propelled vehicle having a steering knuckle and a tie-rod connected thereto, of a track comprising a pair of rails having connection with electric source of supply and having a space therebetween, a vertical staff having its lower end extending downwardly in said space and adapted to engage the inner sides of said rails, the upper end of said staff being fixed to said tie-rod, an arm having its upper end pivotally connected with the upper end of said staff, a conductor wheel having two electric-current-conducting discs, adapted to ride upon said track, electric conductors connecting said discs with the electric means for propelling said vehicle, and means to urge said conductor wheel in continuous contact with said rails.

9. The combination with a track having a pair of rails having connection with electric source of supply and having a space therebetween, and an electrically propelled automobile, of a staff having its lower end extending downwardly in said space, a wheel rotatably mounted on said staff and adapted to engage the inner sides of said rails, the upper end of said staff being fixed to the tie-rod of said vehicle whereby engagement of said wheel with the sides of said rails is adapted to steer said automobile, an arm having an end pivotally connected with the upper end of said staff, a conductor wheel comprising a pair of electric-current-conducting side plates, respectively, having holes in their ends, respectively, electric-current-conducting shafts, respectively, rotatably mounted in said holes, electric-current-conducting discs, respectively, having centrally disposes holes therein receiving said shafts, an electric-current-non-conducting disc intermediate said electric-current-conducting discs and fixed thereto, said electric-current-non-conducting disc having greater diameter than said electric-current-conducting disc, an electric-current-non-conducting cross-member fixed intermediate said side plates, means fixing said arm to said cross-member, said conductor wheel adapted to ride upon said rails with the lower portion of said electric-current-non-conducting disc extending into said space, and said electric-current-conducting discs adapted to ride upon said rails, and electric conductors to conduct electric current from said plates to the electrical propelling means of said automobile.

10. The combination with a track having a pair of rails having connection with electric source of supply and having a space therebetween, and an electrically propelled automobile, of a staff having its lower end extending downwardly in said space, a wheel rotatably mounted on said staff and adapted to engage the inner sides of said outer rails, the upper end of said staff being fixed to the tie-rod of said vehicle whereby engagement of said wheel with the sides of said rails is adapted to steer said automobile, an arm having an end pivotally connected with the upper end of said staff, a conductor wheel comprising a pair of electric-current-conducting side plates, respectively, having holes in their front ends, electric-current-conducting shafts, respectively, rotatably mounted in said holes, electric-current-conducting discs, respectively, having centrally disposed holes therein receiving said shafts, an electric-current-non-conducting disc intermediate said electric-current-conducting discs and fixed thereto, said electric current-non-conducting disc having greater diameter than said electric current-conducting discs, an electric-current-non-conducting cross-member fixed intermediate said side plates, means fixing said arm to said cross-member, said conductor wheel adapted to ride upon said rails with the lower portion of said electric-current-non-conducting disc extending into said space, and said electric-current-conducting discs adapted to ride upon upon said rails, and electric conductors to conduct electric current from said plates to the electrical propelling means of said automobile, and resilient means connecting said staff and said arm, whereby said conductor wheel is urged in contact with said rails.

ARTHUR R. HAUFE.